US012764394B2

(12) United States Patent
Yu

(10) Patent No.: US 12,764,394 B2
(45) Date of Patent: Oct. 13, 2026

(54) METHOD, APPARATUS AND SERVER FOR VIDEO PROCESSING

(71) Applicant: DOUYIN VISION CO., LTD., Beijing (CN)

(72) Inventor: Yongyi Yu, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/874,550

(22) PCT Filed: Aug. 16, 2023

(86) PCT No.: PCT/CN2023/113286

§ 371 (c)(1),
(2) Date: Dec. 12, 2024

(87) PCT Pub. No.: WO2024/046124

PCT Pub. Date: Mar. 7, 2024

(65) Prior Publication Data

US 2025/0365482 A1 Nov. 27, 2025

(30) Foreign Application Priority Data

Aug. 29, 2022 (CN) ......................... 202211043521.6

(51) Int. Cl.

*H04N 21/845* (2011.01)
*H04N 19/40* (2014.01)
*H04N 21/2187* (2011.01)

(52) U.S. Cl.

CPC ......... *H04N 21/8456* (2013.01); *H04N 19/40* (2014.11); *H04N 21/2187* (2013.01)

(58) Field of Classification Search

CPC ............... H04N 21/8456; H04N 19/40; H04N 21/2187; H04N 21/2343;

(Continued)

(56) References Cited

U.S. PATENT DOCUMENTS 8,601,154 B2 * 12/2013 Payne ..................... H04L 67/02 709/236
9,351,020 B2 * 5/2016 Good ................. H04N 21/8543

(Continued)

FOREIGN PATENT DOCUMENTS

CN 105847854 A 8/2016
CN 106993199 A 7/2017

(Continued)

OTHER PUBLICATIONS

International Patent Application No. PCT/CN2023/113286; Int'l Search Report; dated Sep. 22, 2023; 3 pages.

(Continued)

*Primary Examiner* — Sahar Aqil Riaz
(74) *Attorney, Agent, or Firm* — BakerHostetler

(57) ABSTRACT

The disclosure provides a method, an apparatus, and a server for video processing, and the method includes: receiving a playing request for a first video, and obtaining a plurality of video stream encoding results associated with a plurality of video parameters of the first video; determining, from the plurality of video stream encoding results, a target encoding result associated with the target video parameter, and transcoding the target encoding result to obtain a first video stream; determining a first playing progress of the first video stream and a slice record of a second video stream, wherein the second video stream is a video stream that has been transcoded and sliced from the plurality of video stream encoding results; slicing the first video stream based on the first playing progress and the slice record to obtain a video slice, and sending the video slice to the electronic device.

20 Claims, 9 Drawing Sheets

(58) Field of Classification Search
CPC ..... H04N 21/234309; H04N 21/23439; H04N 21/4402; H04N 21/845
USPC .......................................................... 725/116
See application file for complete search history.

(56) References Cited

U.S. PATENT DOCUMENTS

| | | | | |
|---|---|---|---|---|
| 9,510,028 | B2 * | 11/2016 | Yang | H04N 19/593 |
| 10,051,275 | B2 * | 8/2018 | Luthra | H04N 19/61 |
| 11,483,598 | B2 * | 10/2022 | Thangaraj | H04L 67/563 |
| 2010/0110163 | A1 * | 5/2010 | Bruls | H04N 21/816 348/E13.001 |
| 2011/0026608 | A1 * | 2/2011 | Luthra | H04N 19/174 375/E7.2 |
| 2011/0138021 | A1 * | 6/2011 | Payne | H04W 4/12 709/219 |
| 2016/0337648 | A1 * | 11/2016 | Luthra | H04N 19/597 |
| 2017/0171579 | A1 | 6/2017 | Liu et al. | |
| 2017/0280193 | A1 * | 9/2017 | Wang | H04N 21/2187 |
| 2017/0357875 | A1 * | 12/2017 | Hardee | G06F 18/22 |
| 2021/0185373 | A1 * | 6/2021 | Thangaraj | H04L 65/765 |
| 2022/0107861 | A1 * | 4/2022 | Khadiwala | G06F 11/1092 |

FOREIGN PATENT DOCUMENTS

| | | | |
|---|---|---|---|
| CN | 108235064 | A | 6/2018 |
| CN | 110149524 | A | 8/2019 |
| CN | 111294612 | A | 6/2020 |
| CN | 111526387 | A | 8/2020 |
| CN | 111770390 | A | 10/2020 |
| CN | 111836076 | A | 10/2020 |
| CN | 112333461 | A | 2/2021 |
| CN | 109246443 | B | 3/2021 |
| CN | 113905257 | A | 1/2022 |
| CN | 114302254 | A | 4/2022 |
| CN | 114339291 | A | 4/2022 |
| WO | WO 2016/011823 | A1 | 1/2016 |
| WO | WO 2018/171567 | A1 | 9/2018 |

OTHER PUBLICATIONS

China Patent Application No. 202211043521.6; Office Action; dated Nov. 12, 2025; 12 pages.

China Patent Application No. 202211043521.6; Notification to Grant; dated Apr. 14, 2026; 7 pages.

* cited by examiner

METHOD, APPARATUS AND SERVER FOR VIDEO PROCESSING

RELATED APPLICATIONS

This application is a U.S. National Stage Application of PCT International Application No. PCT/CN2023/113286, filed on Aug. 16, 2023, which claims priority to Chinese Patent Application No. 202211043521.6 filed on Aug. 29, 2022, entitled "METHOD, APPARATUS AND SERVER FOR VIDEO PROCESSING", the entire contents of which are incorporated herein by reference.

FIELD

Embodiments of the present disclosure relate to the field of video processing technologies, and in particular, to a method, an apparatus and a server for video processing.

BACKGROUND

A server may slice a video and send the video slice to an electronic device, so that the user can watch the video content in time. For example, the server may slice a live video, and then send the live video slice to the electronic device.

At present, when slicing videos with different definitions, in order to ensure that users watch the same slice content when switching from one definition to another definition, the slice locations of each video associated with each definition needs to be synchronized, so that the server may simultaneously generate videos with different definitions, and synchronously slice each video at a same position. For example, the server may generate a standard definition, a high-definition and super-definition live video, and slicing the live videos of three code rate at the same position, so that the corresponding live video slice can be sent to the electronic device according to the request of the electronic device. However, in the foregoing method, in order to realize that the live video with different definitions can be correctly matched and presented to the user when the user switches between the live video of different definitions, the server transcodes all the video with different definitions and synchronously slices, which leads to the waste of transcoding resources.

SUMMARY

The present disclosure provides a method, an apparatus and a server for video processing, which are used for solving the technical problem of waste of transcoding resources in the prior art.

According to a first aspect, the present disclosure provides a method for video processing, including:

- receiving a playing request for a first video, and obtaining a plurality of video stream encoding results associated with a plurality of video parameters of the first video, where the playing request includes a target video parameter used by an electronic device to play the first video, and the plurality of video parameters include the target video parameter;
- determining, from the plurality of video stream encoding results, a target encoding result associated with the target video parameter, and transcoding the target encoding result to obtain a first video stream;
- determining a first playing progress of the first video stream and a slice record of a second video stream, where the second video stream is a video stream that has been transcoded and sliced from the plurality of video stream encoding results;
- slicing the first video stream based on the first playing progress and the slice record to obtain a video slice, and sending the video slice to the electronic device.

According to a second aspect, the present disclosure provides an apparatus for video processing, including a receiving module, a first determining module, a transcoding module, a second determining module, a processing module and a sending module, where:

- the receiving module is configured to receive a playing request for a first video, and obtain a plurality of video stream encoding results associated with a plurality of video parameters of the first video, where the playing request includes a target video parameter used by an electronic device to play the first video, and the plurality of video parameters include the target video parameter;
- the first determining module is configured to determine, from the plurality of video stream encoding results, a target encoding result associated with the target video parameter;
- the transcoding module is configured to: the target encoding result to obtain a first video stream;
- the second determining module is configured to determine a first playing progress of the first video stream and a slice record of a second video stream, where the second video stream is a video stream that has been transcoded and sliced from the plurality of video stream encoding results;
- the processing module is configured to the first video stream based on the first playing progress and the slice record to obtain a video slice;
- the sending module is configured to send the video slice to the electronic device.

According to a third aspect, an embodiment of the present disclosure provides a server, including a processor and a memory.

- the memory storing computer executable instructions; and
- the processor executing the computer-executable instructions stored in the memory to cause the processor to perform the method for video processing according to the first aspect and various possible implementations of the first aspect.

According to a fourth aspect, an embodiment of the present disclosure provides a computer-readable storage medium, where the computer-readable storage medium stores computer-executable instructions, and the computer-executable instructions, when executed by the processor, implement the method for video processing according to the first aspect and various possible implementations of the first aspect.

According to a fifth aspect, an embodiment of the present disclosure provides a computer program product, including a computer program, where the computer program, when executed by a processor, implements the method for video processing according to the first aspect and various possible implementations of the first aspect.

According to a sixth aspect, an embodiment of the present disclosure provides a computer program, where the computer program, when executed by a processor, implements the method for video processing according to the first aspect and the possible embodiments of the first aspect.

BRIEF DESCRIPTION OF DRAWINGS

In order to more clearly illustrate the embodiments of the present disclosure or the technical solutions in the prior art, the accompanying drawings used in the description of the embodiments or the prior art will be briefly introduced below, and it will be apparent that the drawings in the following description are some embodiments of the present disclosure, and those skilled in the art may also obtain other drawings according to these drawings without creative labor.

DETAILED DESCRIPTION

Figure 1:
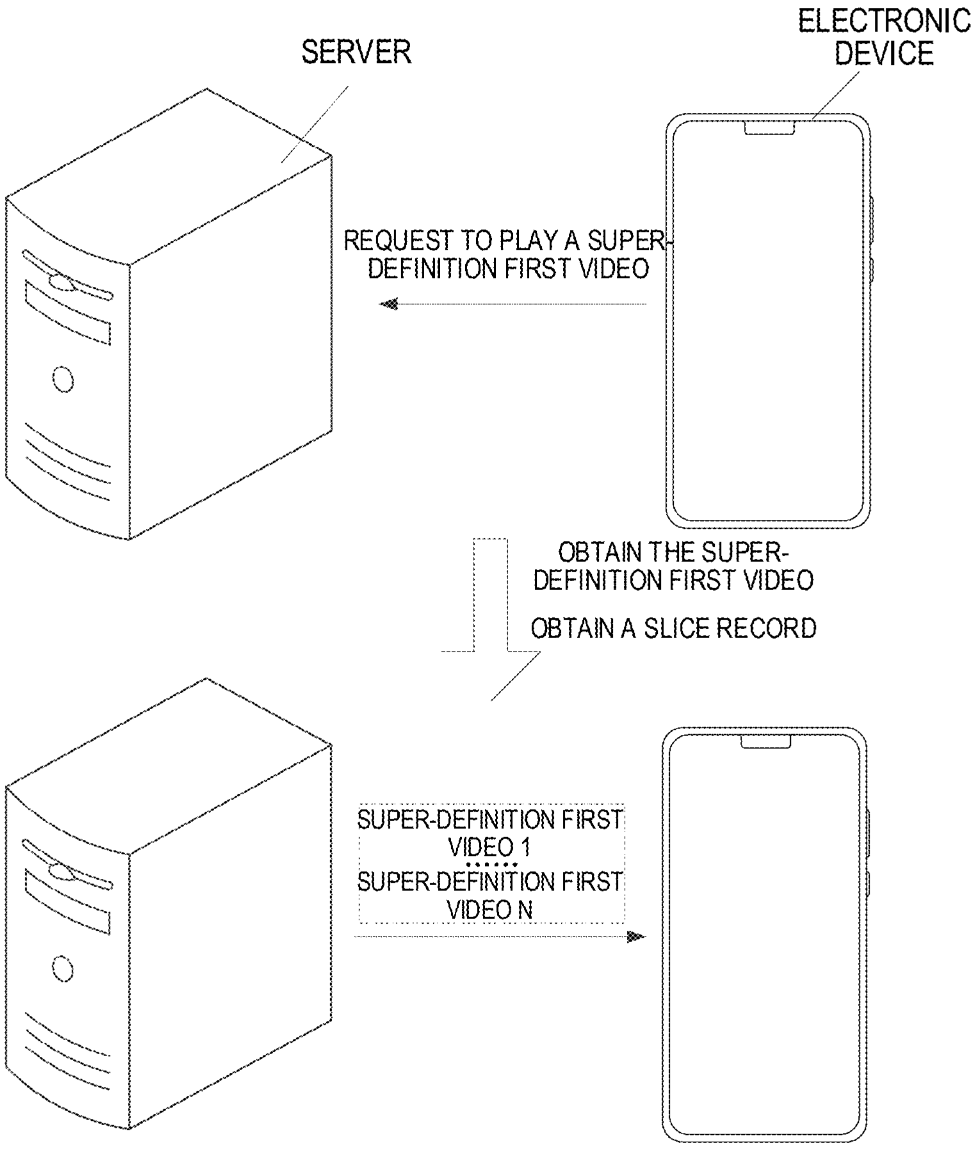
FIG. 1 is a schematic diagram of an application scenario according to an embodiment of the present disclosure.

Exemplary embodiments will be described in detail herein, examples of which are illustrated in the accompanying drawings. The following description relates to the accompanying drawings, in which like numerals indicate like or similar elements unless otherwise indicated. The embodiments described in the following exemplary embodiments do not represent all embodiments consistent with the present disclosure. Rather, they are merely examples of devices and methods consistent with some aspects of the disclosure as detailed in the appended claims.

It should be noted that, in this specification, the terms "including". "comprising", or any other variant thereof are intended to cover a non-exclusive inclusion, such that a process, method, product, or apparatus that includes a series of elements includes not only those elements but also other elements not explicitly listed, or elements inherent to such processes, methods, products, or apparatuses. Without further restriction, the elements defined by the statement "include one" do not preclude the presence of additional identical elements in the process, method, product, or apparatus that includes the element.

For ease of understanding, the concepts involved in the embodiments of the present disclosure are first described.

An electronic device is a device having a wireless transceiver function. The electronic device may be deployed on land, including indoor or outdoor, handheld, wearable, or vehicle-mounted; or may be deployed on the water surface (for example, a ship, etc.). The electronic device may be a mobile phone, a tablet computer (PAD), a computer with a wireless transceiver function, a virtual reality (VR) electronic device, an augmented reality (AR) electronic device, a wireless terminal in industrial control, a vehicle-mounted electronic device, a wireless terminal in a self-driving, a wireless electronic device in a remote medical device, a wireless electronic device in a smart grid, a wireless electronic device in transportation safety, a wireless electronic device in a smart city, a wireless electronic device in a smart home, a wearable electronic device, and the like. The electronic device according to the embodiments of the present disclosure may also be referred to as a terminal, user equipment (UE), an access electronic device, an in-vehicle terminal, an industrial control terminal, a UE unit, a UE station, a mobile station, a mobile station, a remote station, a remote electronic device, a mobile device, a UE electronic device, a wireless communication device, a UE agent, or a UE device. The electronic device may also be stationary or mobile.

Slicing: dividing a video into a plurality of video segments, where each video segment is a video slice. For example, in the livestream field, the server may send the live video to the electronic device through the stream, so that the user can watch the livestreaming content in time, therefore, the server may slice the live video, and then send the live video slice to the electronic device slice by slice, thereby reducing the delay of the live video that the user is watching, and improving the user experience.

In the related art, the server may slice the video and send the video slice to the electronic device, so that the user may watch the video content in time and reduce the playing delay. One video may be associated with different definitions (for example, the video has a standard definition, a high-definition or an super-definition), and in order to ensure that the content of the slice watched when the user switches the definition is the same when the video slice is performed, the slices may be synchronized among the videos with different definitions, and therefore, when slicing the video with any definition, the server may simultaneously generate videos of all definitions, and perform slicing processing on all the videos with the same definition at the same location. However, in order to realize that the live video with different definitions can be correctly matched and presented to the user when the user switches between the live video of different definitions, the server transcodes all the video with different definitions and synchronously slices, which leads to the waste of transcoding resources.

In order to solve the technical problem in the related art, the present disclosure provides a method for video processing. A playing request for playing a target video parameter of a first video by an electronic device is obtained, a plurality of video stream encoding results associated with a plurality of video parameters of the first video is obtained, a target encoding result associated with the target video parameter from the plurality of video stream encoding results is determined, the target encoding result is transcoded to obtain a first video stream, a playing progress of the first video stream and a slice record of at least one second video stream that has been transcoded and sliced are determined, a latest slice location in terms of the playing progress from the plurality of slice locations is determined based on a playing progress associated with the plurality of slice locations, and the first video stream is sliced based on the first playing progress and the first slice location to obtain the video slice. In this way, because the transcoding of the video is decoupled from the slicing of the video, the flexibility of the slicing can be improved, and since the server can slice the first video stream according to the slice record of the other video stream, the server can only obtain the first video stream, and the slice locations of the first video stream can be kept consistent with the slice locations of the other video stream, thereby saving the transcoding resources of the server.

An application scenario of an embodiment of the present disclosure will be described below with reference to FIG. 1.

FIG. 1 is a schematic diagram of an application scenario according to an embodiment of the present disclosure. Referring to FIG. 1, a server and an electronic device are included. The electronic device sends a request message for requesting to play a first video with a super-definition to the server, and when the server receives the message, the server may transcode, from the multiple super-definition video streams associated with the first video, a super-definition video stream to obtain a super-definition first video, and obtain slice records of other slices that have been sliced. The server may slice the super-definition first video in real time according to the playing progress of the super-definition first video and the slice records of the other video streams to obtain a plurality of super-definition first video segments, and send the super-definition first video segments obtained in real time to the electronic device. In this way, since the server can slice the super-definition first video according to the slice records of the other video streams, the slice locations of the super-definition first video can be kept consistent with the slice locations of the other video streams, and the server can only obtain the super-definition first video without transcoding other intelligible first videos (e.g., standard-definition, high-definition, etc.), thereby saving the transcoding resources of the server.

The technical solutions of the present disclosure and the technical solutions of the present disclosure are described in detail below with reference to specific embodiments. The following several specific embodiments may be combined with each other, and the same or similar concepts or processes may not be repeated in some embodiments. Embodiments of the present disclosure will be described below with reference to the accompanying drawings.

Figure 2:
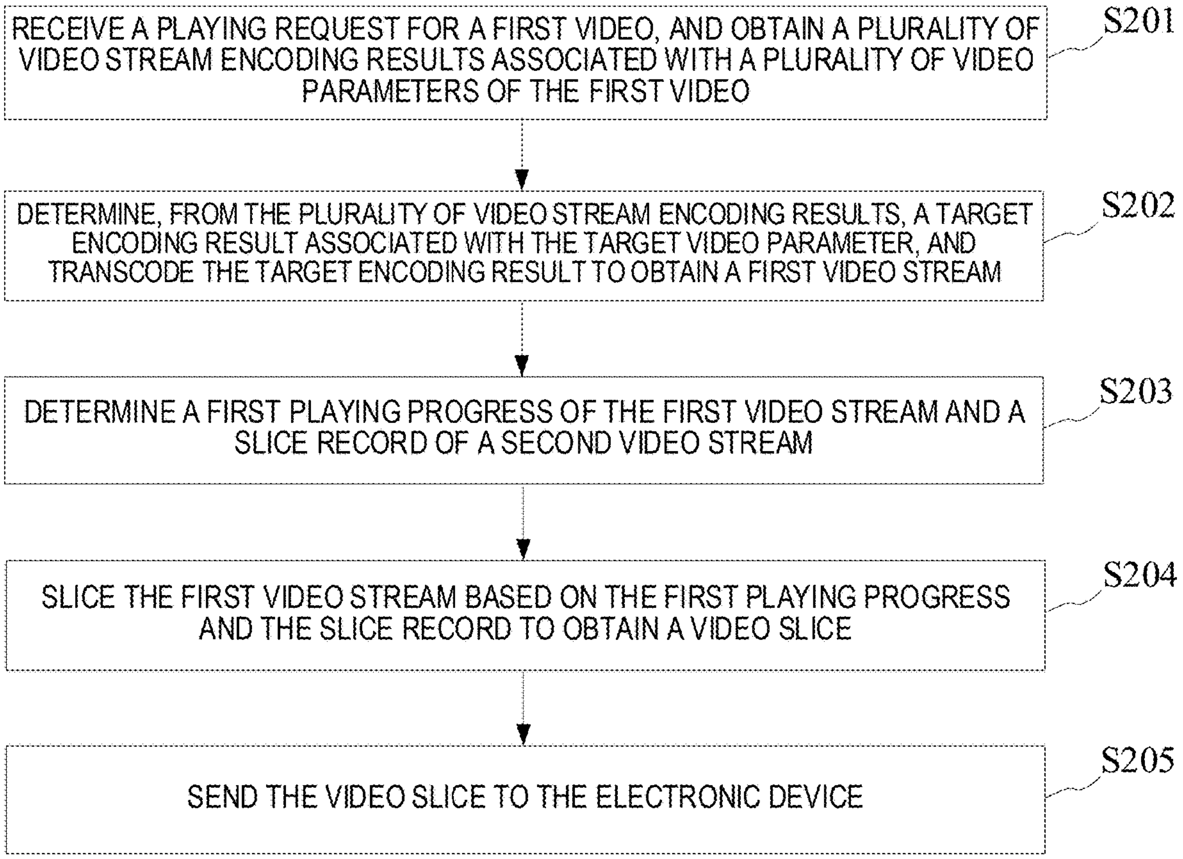
FIG. 2 is a schematic flowchart of a method for video processing according to an embodiment of the present disclosure.

FIG. 2 is a schematic flowchart of a method for video processing according to an embodiment of the present disclosure. Referring to FIG. 2, the method may include the following steps.

S201: receive a playing request for a first video, and obtain a plurality of video stream encoding results associated with a plurality of video parameters of the first video.

The executing body of the embodiment of the present disclosure may be a server or an apparatus for video processing disposed in a server. The apparatus for video processing may be implemented by software, and the apparatus for video processing may also be implemented by combining software and hardware.

The first video may include a live video. For example, the first video may be a live video, and the server may obtain live video recorded by the electronic device in real time, and send the live video to another electronic device.

Optionally, the first video may also include a video that has been recorded. For example, the first video may be any video such as a short video, a long video, a movie video, an animation video, and the like, which is not limited in the embodiments of the present disclosure.

Optionally, the first video includes a plurality of video stream video stream encoding results respectively associated with the plurality of video parameters. Optionally, the video parameter may include parameters such as a definition and a code rate of transcoding of the first video, which is not limited in the embodiments of the present disclosure. Optionally, the plurality of video parameters includes a target video parameter. For example, the server transcodes (decodes) the video stream video stream encoding results to obtain a corresponding video stream.

Optionally, video parameters of the plurality of video streams are different. For example, the first video may be associated with standard definition video encoding, high-definition video encoding, and super-definition video encoding, respectively. Optionally, the play request includes a target video parameter for playing the first video by the electronic device. For example, in response that the electronic device requests to play the standard-definition live video, the target video parameter may be a definition of the standard-definition, and in response that the electronic device requests to play the high-definition live video, the target video parameter is a definition that may be high-definition, and in response that the electronic device requests to play the super-definition video, the target video parameter may be a code rate of super-definition.

Optionally, after receiving the playing request of the first video, the server may obtain a plurality of video stream encoding results corresponding to the plurality of video parameters associated with the first video. For example, when the server determines that the electronic device requests to play the first video, a plurality of video stream encoding results of a plurality of definitions associated with the first video may be obtained in the database.

S202: determine, from the plurality of video stream encoding results, a target encoding result associated with the target video parameter, and transcode the target encoding result to obtain a first video stream.

Optionally, the first video stream may be a video stream associated with the target video parameter. For example, in response that the target video parameter is standard-definition, the first video stream is a standard-definition video stream (the video content is the same as the content of the first video); in response that the target video parameter is high-definition, the first video stream is a high-definition video stream; and in response that the target video parameter is an super-definition, the first video stream is a super-definition video stream.

Optionally, the server may determine, from the plurality of video stream encoding results, a target encoding result based on the target video parameter, and transcode the target encoding result to obtain the first video stream. For example, the database may include video stream encoding results associated with a plurality of video parameters, the server may determine, from the plurality of video stream encoding results, a target encoding result based on the identifier of the target video parameter, and then transcode the target encoding result to obtain the first video stream.

S203: determine a first playing progress of the first video stream and a slice record of a second video stream.

Optionally, the first playing progress is used to indicate a moment at which the first video stream is currently played. For example, the first playing progress may be that the first video is played at $5^{th}$ second, $10^{th}$ second, the $15^{th}$ second, and the like. For example, the server may determine the first playing progress of the first video stream based on the currently played video frame of the first video stream.

Optionally, the second video stream is a video stream that has been transcoded and processed in multiple video streams. For example, the second video stream may be a video stream that has been requested, before the server generates the first video stream, the electronic device has requested a second video stream of other definition, and the second video stream has been sliced. For example, when the user uses the electronic device to watch the high-definition live video, in response that the user switches the high-definition to be super-definition, the electronic device requests to obtain the super-definition live video from the server, and since the high-definition live video has already undergone slicing processing in the playing process, the high-definition live video is the second video stream, and the server may obtain the slice record of the high-definition live video.

Optionally, the second video stream may be a video stream associated with a video parameter when the first video is played for the first time. For example, when the user uses the electronic device to watch the live video for the first time, in response that the user selects the video parameter of the live video as standard-definition, the second video stream may be the live video with the standard-definition, and in response that the video parameter of the live video selected by the user is the high-definition, the second video stream may be the live video with high-definition, and in response that the user selects the video parameter of the live video as super-definition, the second video stream may be the live video with super-definition.

Optionally, the slice record includes a plurality of slice locations. For example, the slice record of the second video stream may include each slice location of the video stream associated with the plurality of video parameters of the first video before the server obtains the first video stream. For example, the slice location may be a location of a video frame in the first video stream, or may be a timestamp associated with a video frame in the first video stream, which is not limited in this embodiment of the present disclosure.

Optionally, the slice record may further include a sequence number of the slice. For example, because the slice locations of the plurality of video streams with different definitions associated with the first video are all the same, the slice record may include a sequence number of a slice associated with each slice location.

The slice record is described below with reference to FIG. 3.

Figure 3:
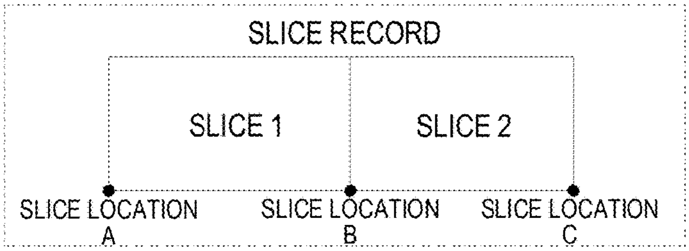
FIG. 3 is a schematic diagram of a slice record according to an embodiment of the present disclosure.

FIG. 3 is a schematic diagram of a slice record according to an embodiment of the present disclosure. Referring to FIG. 3, a slice record is included. The slice record includes a slice location A, a slice location B, and a slice location C. The playing progress associated with the slice location A is less than the playing progress associated with the slice location B, and the playing progress associated with the slice location B is less than the playing progress associated with the slice location C. The slice 1 may be obtained based on the slice location A and the slice location B, and the slice 2 may be obtained based on the slice location B and the slice location C. The slice 1 is the first slice, and the slice 2 is the second slice.

S204: slice the first video stream based on the first playing progress and the slice record to obtain a video slice.

The server may slice the first video stream based on a feasible implementation manner, to obtain a video slice: determining, based on a playing progress associated with the plurality of slice locations, the latest slice location in terms of the playing progress from the plurality of slice locations.

Optionally, the first slice location is a slice location of the latest slice in the slice record. For example, the slice location may be a timestamp, and the first slice location is a maximum timestamp in the slice record. For example, the slice record includes the slice location A and the slice location B, the playing progress associated with the slice location A is the playing progress A, the playing progress associated with the slice location B is the playing progress B, in response that the playing progress B is less than the playing progress A, the slice location A is determined to be the first slice location, and in response that the playing progress A is less than the playing progress B, the slice location B is determined to be the first slice location.

It should be noted that the latest first slice location may be a location already at the location slice, or may be a location not yet at the location slice, which is not limited in this embodiment of the present disclosure. For example, in response that the server does not slice at the first slice location, it indicates that the latest video slice has not been generated, and after slicing at the first slice location, the server may obtain the latest video slice.

The first video stream is sliced based on the first playing progress and the first slice location to obtain the video slice. For example, the server may determine, based on a relationship between the first playing progress and the first slice location, whether the first video stream has the right to decide the slicing, in response that the first video stream is the fastest to play, the first video stream has the right to decide the slicing, the server may slice the first video stream based on a predetermined slicing decision, and in response that the playing progress of video stream with other definitions is faster than the playing progress of the first video stream, the first video stream does not have the right to decide the slicing, and the server may slice the first video stream based on slice records of the other video streams.

S205: send the video slice to the electronic device.

Optionally, when obtaining the video slice of the first video stream, the server may send the video slice to the electronic device. For example, the server may slice the first video stream into a plurality of video slices, and the server may send the video slice to the electronic device when each video slice is obtained, and the server may also obtain a plurality of video slices when the plurality of video slices is obtained, which is not limited in the embodiments of the present disclosure.

The process of sending the video slice to the electronic device is described below with reference to FIG. 4.

Figure 4:
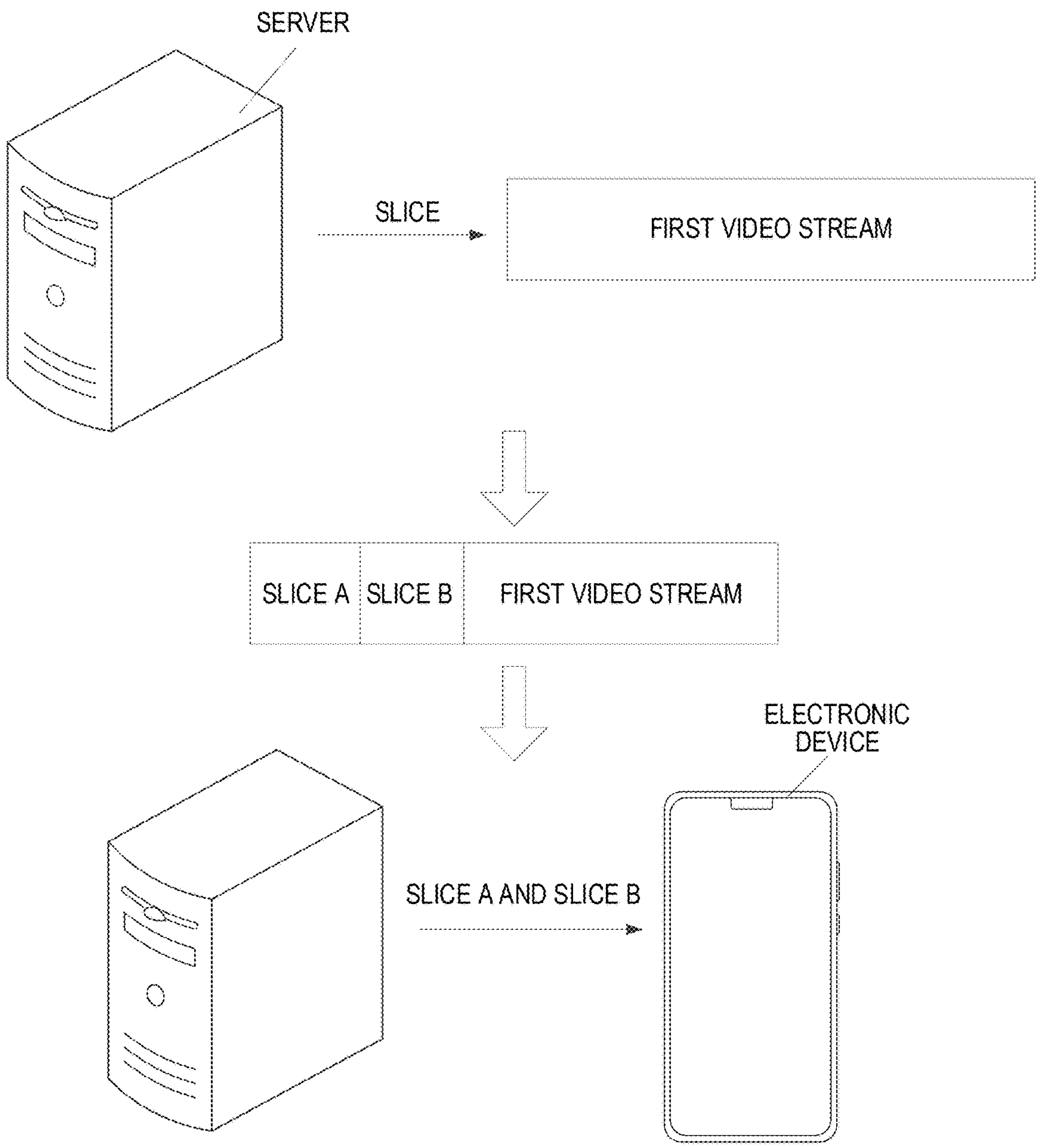
FIG. 4 is a schematic diagram of a process of sending a video slice according to an embodiment of the present disclosure.

FIG. 4 is a schematic diagram of a process of sending a video slice according to an embodiment of the present disclosure. Referring to FIG. 4, a server and an electronic device are included. The server may slice the first video stream based on the slice record. When the server slices the first video stream to obtain the slice A and the slice B, the server sends the slice A and the slice B to the electronic device. In this way, each time the server obtains the video slice in the first video stream, the server may send the video slice to the electronic device in time, so that the user may watch the video content in time, and the user experience is improved.

The embodiment of the present disclosure provides a method for video processing, including: receiving a playing request for a first video, and obtaining a plurality of video stream encoding results associated with a plurality of video parameters of the first video, where the playing request includes a target video parameter used by an electronic device to play the first video; determining, from the plurality of video stream encoding results, a target encoding result associated with the target video parameter, and transcoding the target encoding result to obtain a first video stream; determining a first playing progress of the first video stream and a slice record of a second video stream, where the second video stream is a video stream that has been transcoded and sliced from the plurality of video stream encoding results; slicing the first video stream based on the first playing progress and the slice record to obtain a video slice, and sending the video slice to the electronic device. In the foregoing method, because the server may obtain a slice record of another video stream, and slice the first video stream based on the first playing progress and the slice record of the first video stream, a slice location of the first video stream is the same as a slice location of another video stream, and there is no need to generate other high-definition video streams for synchronous slicing at the same time, thereby saving transcoding resources of the server.

Figure 5:
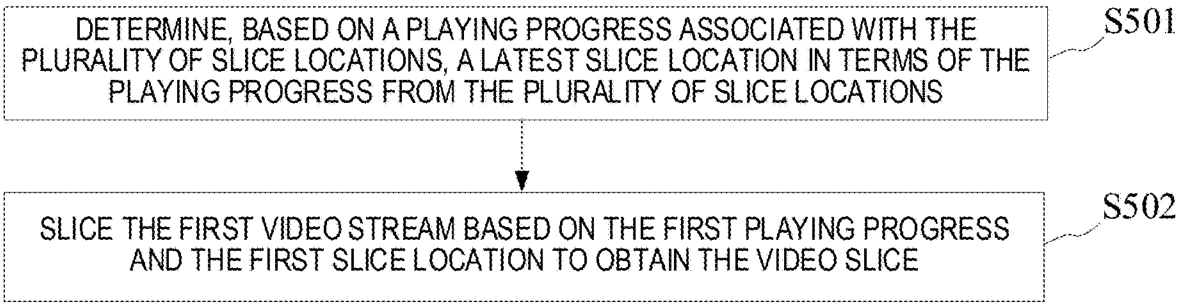
FIG. 5 is a schematic flowchart of a method for obtaining video slice according to an embodiment of the present disclosure.

Based on the embodiment shown in FIG. 2, in conjunction with FIG. 5, in the foregoing method for video processing, the first video stream is sliced based on the first playing progress and the slice record, to obtain a video slice process.

FIG. 5 is a schematic flowchart of a method for obtaining video slice according to an embodiment of the present disclosure. Referring to FIG. 5, the method includes the following steps.

S501: determine, based on a playing progress associated with the plurality of slice locations, a latest slice location in terms of the playing progress from the plurality of slice locations.

The process of determining the first slice location is described below with reference to FIG. 6.

Figure 6:
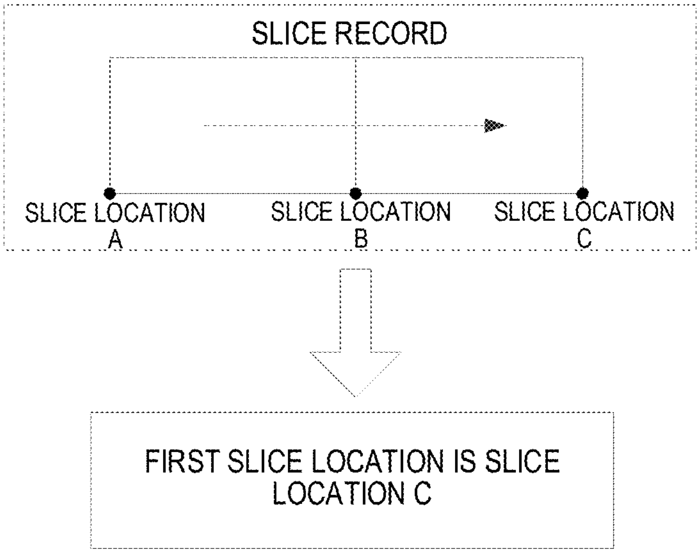
FIG. 6 is a schematic diagram of a process of determining a first slice location according to an embodiment of the present disclosure.

FIG. 6 is a schematic diagram of a process of determining a first slice location according to an embodiment of the present disclosure. Referring to FIG. 6, a slice record is included. The slice record includes a slice location A, a slice location B, and a slice location C. The playing progress associated with slice location A is less than the playing progress associated with slice location B, and the playing progress associated with slice location B is less than the playing progress associated with slice location C. Since the playing progress associated with the slice location C is the fastest, it may be determined that the first slice location is the slice location C.

S502: slice the first video stream based on the first playing progress and the first slice location to obtain the video slice.

Optionally, slicing the first video stream based on the first playing progress and the first slice location to obtain the video slice includes the following two cases:

Case 1: the first playing progress is less than or equal to the second playing progress associated with the first slice location.

In response that the first playing progress is less than or equal to the second playing progress associated with the first slice location, whether the second video stream is sliced at the first playing progress is detected in the slice record, to obtain a detection result, and the first video stream is sliced based on the detection result.

Optionally, the detection result is used to indicate whether the second video stream is sliced at the first playing progress. For example, because the first playing progress is less than the second playing progress, it indicates that the playing progress of the video stream with other definitions is greater than the playing progress of the first video stream.

Optionally, slicing the first video stream based on the detection result specifically includes: in response that the detection result indicates that the second video stream is sliced at the first playing progress, slicing the first video stream at the first playing progress to obtain the video slice. For example, in response that the other faster video streams are sliced at the first playing progress, the server may slice the first video stream at the first playing progress, so that the slice locations of the first video stream are the same as the slice locations of the other video streams, which may ensure that the video contents that are played by the same slices with different definitions are the same, thereby improving the video playing effect and improving the user experience.

In response that the detection result indicates that the second video stream is not sliced at the first playing progress, the second slice location after the first playing progress is obtained, and the first video stream is sliced at the playing progress associated with the second slice location to obtain the video slice. For example, in response that another faster video stream is not sliced at the first playing progress, the server may not slice the first video stream at the location, the server may obtain the next slice location after the location, and slice the first video stream at the playing progress associated with the next slice location. For example, the first playing progress is the video frame A, the playing progress of the next slice location after the video frame A is the video frame B (the timestamp of the video frame A is less than the timestamp of the video frame B), and in response that other faster video streams are not sliced at the position of the video frame A, but the location of the video frame B is sliced, the server does not slice the first video stream at the position of the video frame A, and slices the first video stream at the position of the video frame B.

In the following, with reference to FIG. 7A to FIG. 713, in this case, a process of performing slice processing on the first video stream is described.

Figure 7A:
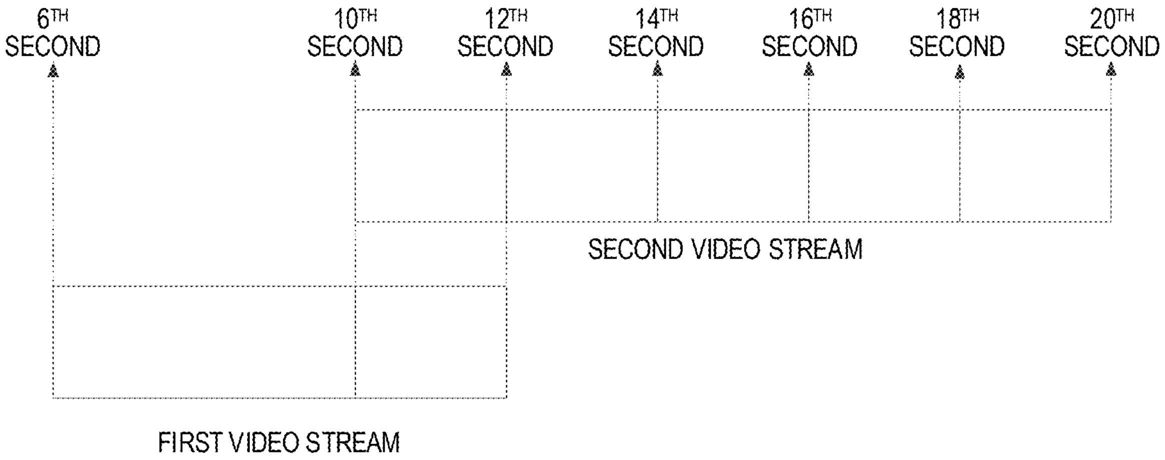
FIG. 7A is a schematic diagram of slicing a first video stream according to an embodiment of the present disclosure.

FIG. 7A is a schematic diagram of slicing a first video stream according to an embodiment of the present disclosure. Referring to FIG. 7A, a first video stream and a second video stream are included. The second video stream has been played from $10^{th}$ second to $20^{th}$ second, and the second video stream is sliced at $10^{th}$, $12^{th}$, $14^{th}$, $16^{th}$, $18^{th}$ and $20^{th}$ seconds. When the playing progress of the first video stream is at the 6th second, since the playing progress at $6^{th}$ second is less than the playing progress at $10^{th}$ second, the first video stream before $10^{th}$ second may be discarded (or no slice processing may be performed), and when the first video stream is played at $2^{nd}$ second, the first video stream is sliced. When the first video stream is played at $12^{th}$ second, since the second video stream is sliced at $12^{th}$ second, the first video stream is also sliced at $12^{th}$ second, so as to ensure that the slice locations between the first video stream and the second video stream are the same, and when the first video stream is sliced, without transcoding video streams with other definitions, thereby saving the transcoding resources of the server.

Figure 7B:
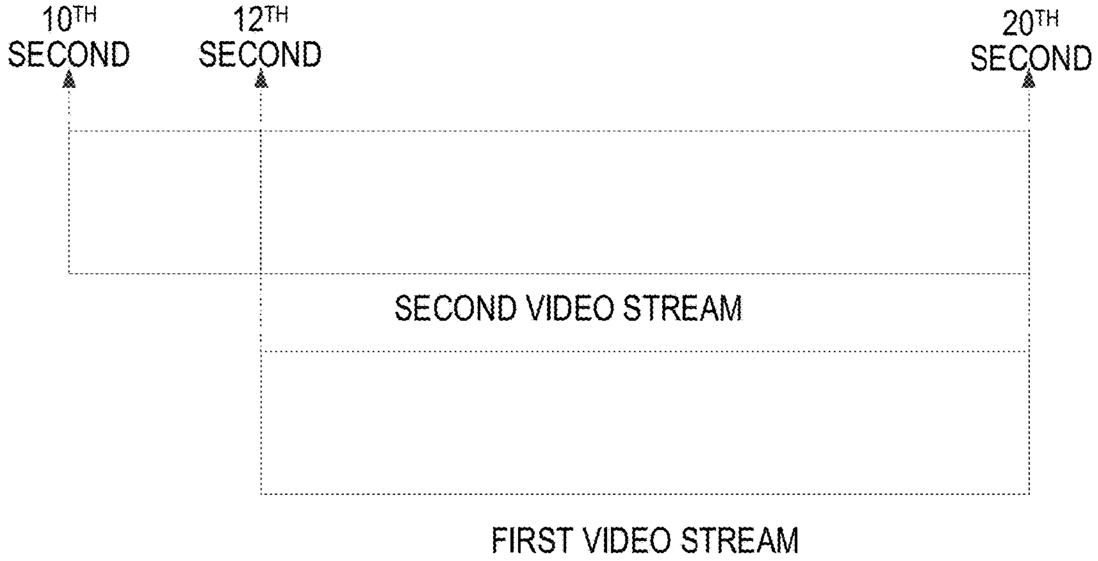
FIG. 7B is another schematic diagram of slicing a first video stream according to an embodiment of the present disclosure.

FIG. 7B is another schematic diagram of slicing a first video stream according to an embodiment of the present disclosure. Referring to FIG. 7B, it includes a first video stream and a second video stream, where the second video stream has been played from 10$^{th}$ second to 20$^{th}$ second. The second video stream is sliced at 10$^{th}$, 12$^{th}$, and 20$^{th}$ seconds to obtain 2 slices. When the playing progress of the first video stream is at 12$^{th}$ seconds, since the second video stream is sliced at 12$^{th}$ second, the first video stream is also sliced at 12$^{th}$ second. When the playing progress of the first video stream is at 14$^{th}$ second, since the second video stream is not sliced at 14$^{th}$ second, the first video stream is not sliced at 14$^{th}$ second, and when the playing progress of the first video stream is at 20$^{th}$ second, the first video stream is sliced at 20$^{th}$ second. In this way, although the first video stream may be sliced at 14$^{th}$ second, since the second video stream is not sliced at 14$^{th}$ second, the first video stream is not sliced at 14$^{th}$ second, it is ensured that the slice locations between the first video stream and the second video stream are the same, and when the first video stream is sliced, there is no need to transcode the video streams with other definitions, thereby, saving the transcoding resources of the server.

Case 2: the first playing progress is greater than the second playing progress.

In response that the first playing progress is greater than the second playing progress, a first duration between the first playing progress and the playing progress associated with a previous slice location is obtained, and the first video stream is sliced based on the first duration. For example, in response that the first playing progress is greater than or equal to the second playing progress, it indicates that the playing progress of the first video stream is the earliest, and the first video stream has the right to decide the slicing. Therefore, the server can obtain the first duration between the first playing progress and the playing progress associated with the previous slice location, and slicing the first video stream based on the first duration to obtain a plurality of video slices. It should be noted that in response that the server slices at the first slice location, the previous slice location is the first slice location. In response that the server does not slice at the first slice location, the previous slice location is the slice location before the first slice location.

Optionally, slicing the first video based on the first duration specifically includes: in response that the first duration is greater than or equal to the first threshold, slicing the first video stream at the first playing progress to obtain the video slice. For example, in response that the first duration is greater than or equal to the first threshold, it indicates that the video length of the slice reaches the threshold, and the server may slice the first video stream at the first playing location.

In response that the first duration is less than the first threshold, the first video stream is sliced until the first duration is equal to the first threshold, to obtain the video slice. For example, in response that the first duration is less than the first threshold, it indicates that the video length of the slice is short, the server does not perform slicing at the first playing progress, and when the first playing progress continues to be played until the first duration is equal to the first threshold, the server may slice the first video stream at the location.

The process of slicing the first video stream in this case is described below with reference to FIG. 8.

Figure 8:
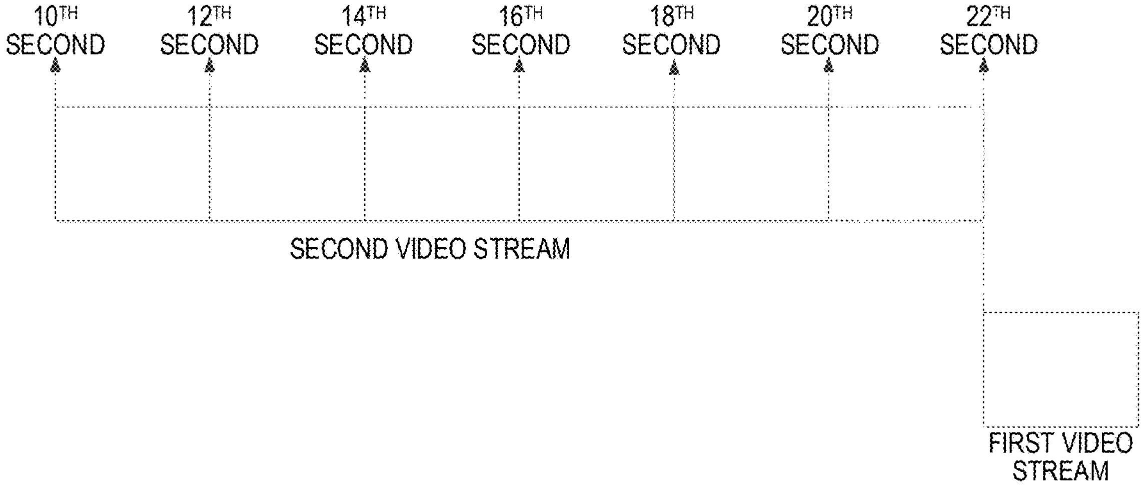
FIG. 8 is yet another schematic diagram of slicing a first video stream according to an embodiment of the present disclosure.

FIG. 8 is a schematic diagram of slicing a first video stream according to an embodiment of the present disclosure. Referring to FIG. 8, a first video stream and a second video stream are included. The second video stream has been played from 10$^{th}$ second to 20$^{th}$ second, and the second video stream is sliced at 10$^{th}$, 12$^{th}$, 14$^{th}$, 16$^{th}$, 18$^{th}$ and 20$^{th}$ seconds. When the playing progress of the first video stream is at 22$^{th}$ second, since the playing progress at 22$^{th}$ second is greater than the playing progress block at 20$^{th}$ second, the first video stream has the right to decide the slicing, the first video stream may be sliced at 22$^{th}$ second, and when the second video stream is played at 22$^{th}$ second, the second video stream may slice the second video stream based on the slice record of the first video stream in the position.

The embodiment of the present disclosure provides a method for obtaining a video slice. The latest slice location in terms of the playing progress is determined from the plurality of slice locations based on a playing progress associated with the plurality of slice locations. The first video stream is sliced based on the first playing progress and the first slice location to obtain the video slice. In this way, the server may flexibly slice the first video stream based on the first slice location and the first playing progress, to improve the flexibility of the slice, and when the first video stream is not the fastest video stream, the server slices the first video stream based on the slice record, to ensure that the slice locations of the video streams with different definitions are the same, and there is no need to generate video streams with other definitions for synchronous slicing at the same time, thereby saving transcoding resources of the server.

Based on any one of the foregoing embodiments, the foregoing method for video processing further includes a process of obtaining a slice record of the second video stream, and the process of obtaining the slice record of the second video stream is described below with reference to FIG. 9.

Figure 9:
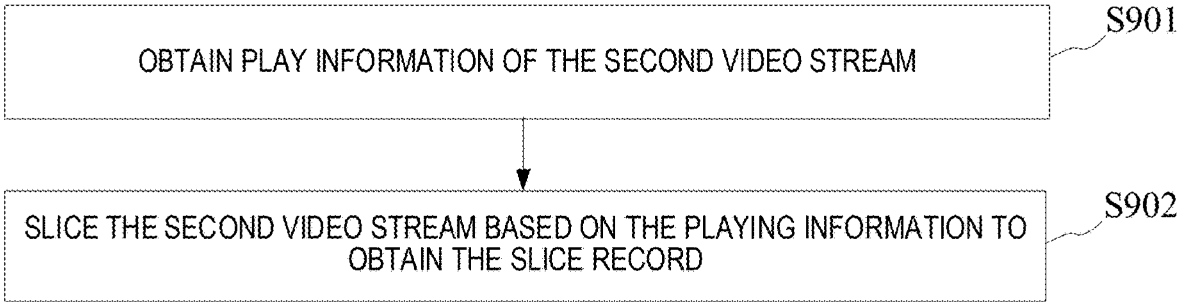
FIG. 9 is a schematic diagram of obtaining a slice record of a second video stream according to an embodiment of the present disclosure.

FIG. 9 is a schematic diagram of obtaining a slice record of a second video stream according to an embodiment of the present disclosure. Referring to FIG. 9, the method includes the following steps.

S901: obtain play information of the second video stream.

Optionally, the play information may include the playing progress of the second video stream and the current video frame information. For example, the play information may include a duration of a slice that is being currently played of the second video stream, whether the video frame that is being currently played is a key frame, or the like. For example, the server may determine, based on the playing progress of the second video stream, the duration of a slice that is being currently played by the second video stream, the server may determine, based on the optical flow information of the second video stream, whether the video frame that is being currently played is a key frame, and the server may alternatively obtain the play information of the second video stream, which is not limited in the embodiments of the present disclosure.

Optionally, the second video stream may be a video stream when the first video is played for the first time. For example, when the user uses the electronic device to watch the live video for the first time, in response that the user selects the definition of the live video as standard-definition, the second video stream may be a live video with standard-definition. It should be noted that because the second video stream is a video stream when the first video is played for the first time, there is no slice record associated with the first video in the server, and the second video stream has the right to decide the slicing.

S902: slice the second video stream based on the playing information to obtain the slice record.

The server may slice the second video stream based on the following feasible implementation manner to obtain the slice record: in response that the play information indicates that a video frame that is being played in the second video stream is a key frame, and/or the play information indicates that a duration of a slice that is being played in the second video stream reaches a second threshold, slicing the second video stream to obtain the slice record. It should be noted that, each time the server slices the second video stream, the server may obtain a playing progress (for example, a timestamp of the video frame) and a sequence number of a slice (for example, the first slice, the second slice, and the like) associated with the slice location, and synchronize the foregoing information to the slice record.

The process of obtaining, the slice record is described below with reference to FIG. 10.

Figure 10:
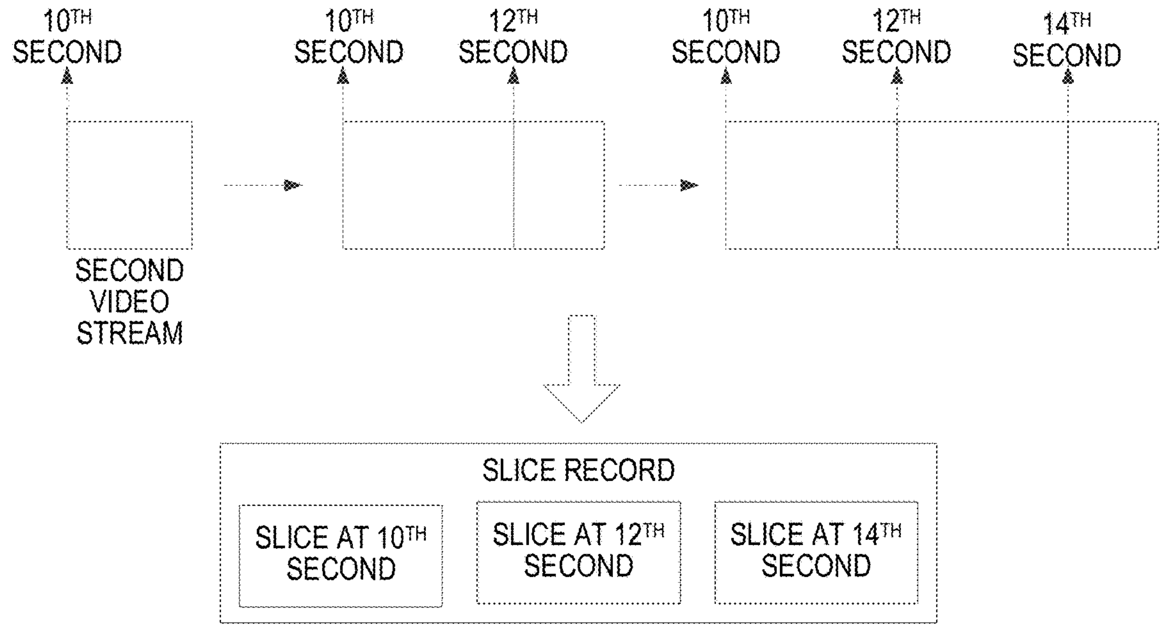
FIG. 10 is a schematic diagram of a process of obtaining a slice record according to an embodiment of the present disclosure.

FIG. 10 is a schematic diagram of a process of obtaining a slice record according to an embodiment of the present disclosure. Please refer to FIG. 10, it includes: a second video stream. The second video stream starts to be played at 10th second, and the second video stream is sliced at $10^{th}$ second. When the playing progress of the second video stream is at $12^{th}$ second, the second video stream is sliced at $12^{th}$ second, and when the playing progress of the second video stream is at $14^{th}$ second, the second video stream is sliced at $14^{th}$ second. In this way, a slice record of the second video stream is obtained, where the slice record includes a slice at $10^{th}$ second, a slice at $12^{th}$ second, and a slice at $14^{th}$ second.

The embodiment of the present disclosure provides a method for obtaining a slice record of a second video stream. The play information of the second video stream is obtained. In response that the play information indicates that a video frame that is being played in the second video stream is a key frame, and/or the play information indicates that a duration of a slice that is being played in the second video stream reaches a second threshold, the second video stream is sliced to obtain the slice record. In this way, because the second video stream is a video stream that plays the first video for the first time, the second video stream has the right to decide the slicing. Slicing the second video stream by using the key frame or the slice duration can improve the accuracy of the slice.

Based on any one of the foregoing embodiments, the foregoing method for video processing further includes a process of initializing a slice record of the first video stream, and the process of initializing the slice record of the first video stream is described below with reference to FIG. 11.

Figure 11:
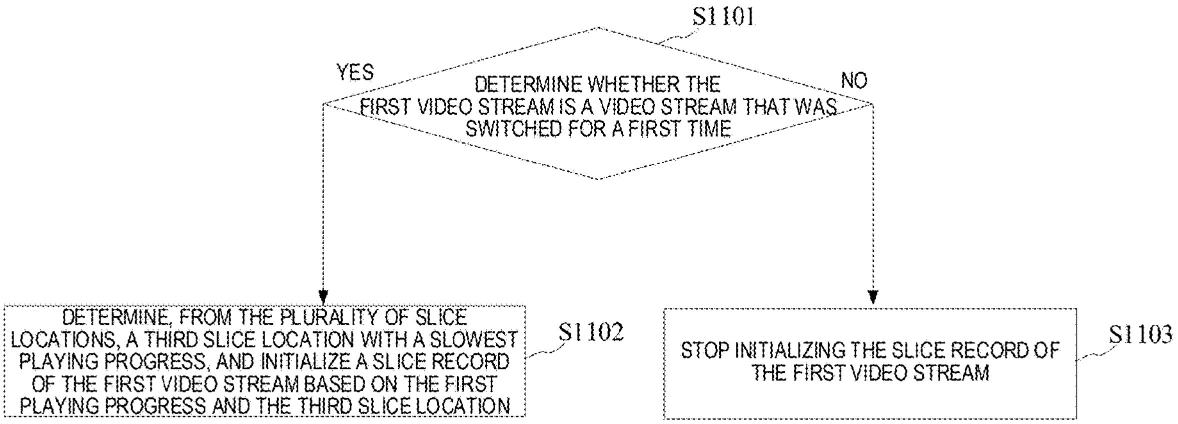
FIG. 11 is a schematic diagram of initializing a slice record of a first video stream according to an embodiment of the present disclosure.

FIG. 11 is a schematic diagram of initializing a slice record of a first video stream according to an embodiment of the present disclosure. Referring to FIG. 11, the method includes the following steps.

S1101: determine whether the first video stream is a video stream that was switched for a first time.

If yes, perform S1102.

If not, perform S1103.

Optionally, in response that the target video parameter (for example, definition) associated with the first video stream is played for the first time, it is determined that the first video stream is a video stream that is switched for the first time, and in response that the first video stream of the target video parameter is not the video stream that is played for the first time, it is determined that the first video stream is not the video stream that is switched for the first time. For example, when the electronic device requests to play the live video with high-definition, in response that the server has previously sent the live video with high-definition to the electronic device, it is determined that the live video with high-definition is not played for the first time; in response that the server has not previously sent the live video with high-definition to the electronic device, it is determined that the live video with high-definition is played for the first time.

S1102: determine, from the plurality of slice locations, a third slice location with a slowest playing progress, and initialize a slice record of the first video stream based on the first playing progress and the third slice location.

Optionally, the third slice location is a slice location of the earliest slice in the slice record. For example, the slice record includes the slice location A and the slice location B, the playing progress associated with the slice location A is the playing progress A, the playing progress associated with the slice location B is the playing progress B, in response that the playing progress A is greater than the playing progress B, the slice location A is determined to be the third slice location, and in response that the playing progress A is greater than the playing progress B, the slice location B is determined to be the third slice location.

Initialize the slice record of the first video stream for synchronizing the slice record of the second video stream to the first video stream. Optionally, the slice record of the first video stream may be initialized based on a feasible implementation manner: in response that the first playing progress is less than a third playing progress associated with the third slice location, discarding the first video stream. For example, in response that the first playing progress is less than the third playing progress associated with the third slice location, it indicates that the playing progress of the first video stream is slower, and there is no slice record of the playing progress in the server (for example, as the live video is played, the server deletes the too early slice locations in the slice record), the server may discard the first video stream, thereby improving the watching experience of the user.

In response that the first playing progress is greater than or equal to the third playing progress associated with the third slice location, the target slice associated with the first playing progress is determined in the slice record, and the slice record of the first video stream is initialized to be the slice record of the target slice. For example, in response that the first playing progress is greater than or equal to the third playing progress associated with the third slice location, it indicates that the playing progress of the first video stream is relatively fast, and the server may determine the target slice to which the first playing progress belongs (for example, the first playing progress is at $2^{nd}$ second, the target slice is from $1^{st}$ second to $3^{rd}$ second), and synchronize information such as the sequence number of the target slice, the slice location (timestamp of the video frame), and the like, to the slice record of the first video stream.

S1103: stop initializing the slice record of the first video stream.

Optionally, in response that the first video stream is not a video stream that is switched for the first time, it indicates that the server has sent a video slice of the first video stream to the electronic device, the first video stream has synchronized slice records of other video streams (for example, the information that the first video stream is sliced starting from the $3^{th}$ slice location), and therefore, the server does not need to initialize a slice record of the first video stream.

The embodiment of the present disclosure provides a method for initializing a slice record of a first video stream, including: determining whether the first video stream is a video stream that was switched at a first time; in response to determining that the first video stream is a video stream that was switched for the first time, determining, from the plurality of slice locations, a third slice location with a slowest playing progress, and initializing a slice record of the first video stream based on the first playing progress and the third slice location; and in response to determining that the first video stream is not a video stream that was switched for the first time, stopping initializing the slice record of the first video stream. In this way, when the first video stream is played for the first time, the server may synchronize slice record of the video stream of the code rate, thereby avoiding slice error of the first video stream and improving the accuracy of the first video stream slice.

Based on any one of the foregoing embodiments, a process of the foregoing method for video processing is described below with reference to FIG. 12.

Figure 12:
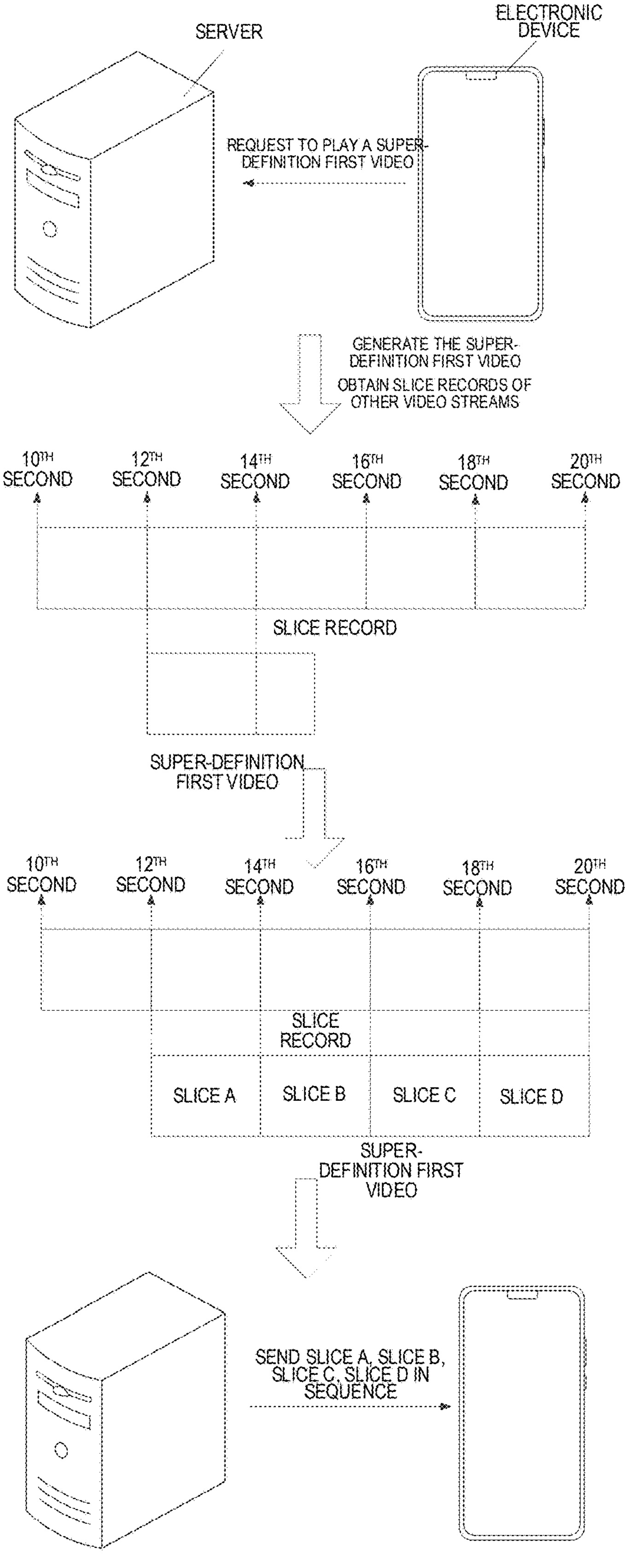
FIG. 12 is a schematic flowchart of a method for video processing according to an embodiment of the present disclosure.

FIG. 12 is a schematic flowchart of a method for video processing according to an embodiment of the present disclosure. Referring to FIG. 12, a server and an electronic device are included. The electronic device sends a request message for requesting to play the first video with super-definition to the server, and when the server receives the message, the server may obtain, from video stream encoding results associated with the plurality of video parameters of the first video, a video stream encoding result, and transcode the video stream encoding results with super-definition to obtain the first video with super-definition, and obtain the slice record of the other video stream.

Referring to FIG. 12, the slice record includes a slice at $10^{th}$ second, a slice at $12^{th}$ second, a slice at $14^{th}$ second, a slice at $16^{th}$ second, a slice at $18^{th}$ second, and a slice at $20^{th}$ second. The first video with super-definition is played from $12^{th}$ second to $15^{th}$ second. Since the other video streams are sliced at $12^{th}$ second and $14^{th}$ second, and are not sliced at $15^{th}$ second, the server slices the first video with super-definition when the first video with super-definition is played at $12^{th}$ second and $14^{th}$ second.

Referring to FIG. 12, when the super-definition first video is played at $20^{th}$ second, since the other video streams are slices at $16^{th}$ second, $18^{th}$ second and $20^{th}$ second, the server slices the first video with super-definition when the first video with super-definition is played to the $16^{th}$ second, the $18^{th}$ second and the $20^{th}$ second. In this way, the server may split the 8-second first video with super-definition into slice A, slice B, slice C, and slice D. The server sequentially sends the slice A, the slice B, the slice C, and the slice D to the electronic device (the server obtains a slice to send a slice to the electronic device). In this way, when the first video stream is not the fastest video stream, the server slices the first video stream based on the slice record, ensures that the slice locations of the video streams of the plurality of code rates are the same, without generating video streams of other code rates for synchronous slicing at the same time, thereby saving the transcoding resources of the server.

Figure 13:
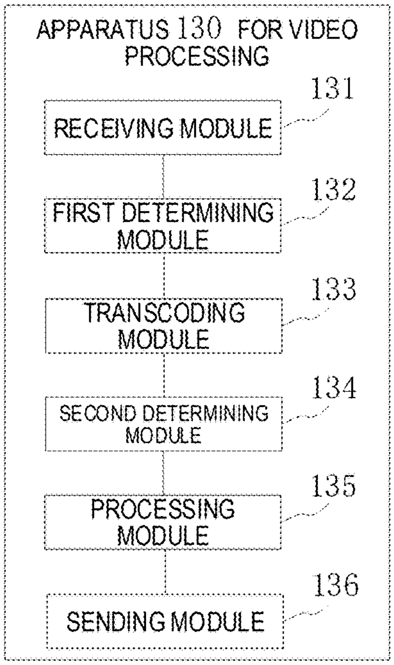
FIG. 13 is a schematic structural diagram of an apparatus for video processing according to an embodiment of the present disclosure.

FIG. 13 is a schematic structural diagram of an apparatus for video processing according to an embodiment of the present disclosure. Referring to FIG. 13, the apparatus 130 for video processing includes a receiving module 131, a first determining module 132, a transcoding module 133, a second determining module 134, a processing module 135, and a sending module 136.

The receiving module 131 is configured to receiving a playing request for a first video, and obtaining a plurality of video stream encoding results associated with a plurality of video parameters of the first video, where the playing request includes a target video parameter used by an electronic device to play the first video, and the plurality of video parameters include the target video parameter.

The first determining module 132 is configured to determine, from the plurality of video stream encoding results, a target encoding result associated with the target video parameter, and transcoding the target encoding result to obtain a first video stream.

The transcoding module 133 is configured to transcode the target code to obtain a first video stream.

The second determining module 134 is configured to a first playing progress of the first video stream and a slice record of a second video stream, where the second video stream is a video stream that has been transcoded and sliced from the plurality of video stream encoding results.

The processing module 135 is configured to slice the first video stream based on the first playing progress and the slice record to obtain a video slice.

The sending module 136 is configured to send the video slice to the electronic device.

In a possible implementation, the processing module 135 is specifically configured to:

- determine, based on a playing progress associated with the plurality of slice locations, a latest slice location in terms of the playing progress from the plurality of slice locations; and
- slicing the first video stream based on the first playing progress and the first slice location to obtain the video slice.

In a possible implementation, the processing module 135 is specifically configured to:

- in response that the first playing progress is less than or equal to a second playing progress associated with the first slice location, detecting, from the slice record, whether the second video stream is sliced at the first playing progress to obtain a detection result, and slicing the first video stream based on the detection result;
- in response that the first playing progress is greater than the second playing progress, obtaining a first duration between the first playing progress and a playing progress associated with a previous slice location, and slicing the first video stream based on the first duration.

In a possible implementation, the processing module 135 is specifically configured to:

- in response that the detection result indicates that the second video stream is sliced at the first playing progress, slicing the first video stream at the first playing progress to obtain the video slice;
- in response that the detection result indicates that the second video stream is not sliced at the first playing progress, obtaining a second slice location after the first playing progress, and slicing the first video stream at a playing progress associated with the second slice location to obtain the video slice.

In a possible implementation, the processing module 135 is specifically configured to:

- in response that the first duration is greater than or equal to a first threshold, slicing the first video stream at the first playing progress to obtain the video slice;
- in response that the first duration is less than the first threshold, slicing the first video stream until the first duration is equal to the first threshold, to obtain the video slice.

The video processing apparatus provided in this embodiment may be configured to perform the technical solutions in the foregoing method embodiments, and implementation principles and technical effects thereof are similar, and details are not described herein again in this embodiment.

Figure 14:
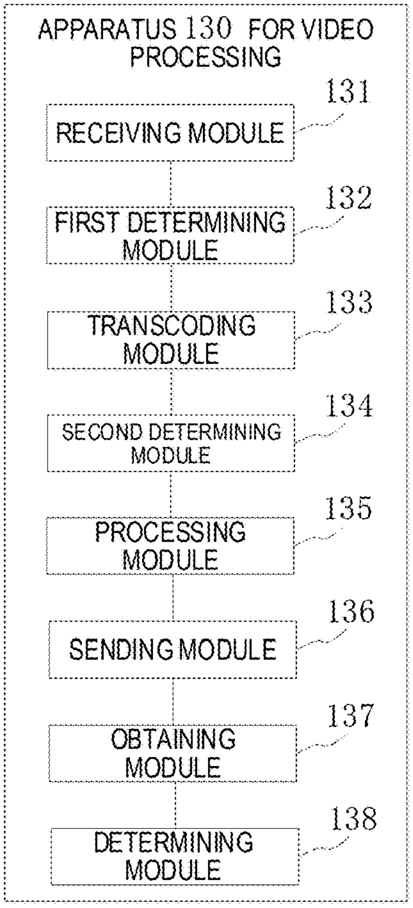
FIG. 14 is a schematic structural diagram of another apparatus for video processing according to an embodiment of the present disclosure.

FIG. 14 is a schematic structural diagram of another apparatus for video processing according to an embodiment of the present disclosure. On the basis of FIG. 13, referring to FIG. 14, the apparatus 130 for video processing further includes an obtaining module 137. The obtaining module 137 is configured to:

obtain play information of the second video stream;

slice the second video stream based on the playing information to obtain the slice record.

In a possible implementation, the obtaining module 137 is specifically configured to:

in response that the play information indicates that a video frame that is being played in the second video stream is a key frame, and/or the play information indicates that a duration of a slice that is being played in the second video stream reaches a second threshold, slice the second video stream to obtain the slice record.

In a possible implementation, the apparatus 130 for video processing further includes a determining module 138, and the determining module 138 is configured to:

determine whether the first video stream is a video stream that was switched at a first time;

in response to determining that the first video stream is a video stream that was switched for the first time, determine, from the plurality of slice locations, a third slice location with a slowest playing progress, and initialize a slice record of the first video stream based on the first playing progress and the third slice location;

in response to determining that the first video stream is not a video stream that was switched for the first time, stop initializing the slice record of the first video stream.

In a possible implementation, the determining module 136 is specifically configured to:

in response that the first playing progress is less than a third playing progress associated with the third slice location, discarding the first video stream;

in response that the first playing progress is greater than or equal to the third playing progress associated with the third slice location, determining, from the slice record, a target slice associated with the first playing progress, and initializing the slice record of the first video stream to the slice record of the target slice.

The video processing apparatus provided in the embodiments of the present disclosure may be configured to perform the technical solutions in the foregoing method embodiments, and implementation principles and technical effects thereof are similar, and details are not described herein again in this embodiment.

An embodiment of the present disclosure further provides a computer-readable storage medium, where the computer-readable storage medium stores computer-executable instructions, and the computer-executable instructions, when executed by the processor, implement the method according to the foregoing method embodiments.

An embodiment of the present disclosure further provides a computer program, where the computer program, when executed by a processor, implements the method according to the foregoing method embodiments.

An embodiment of the present disclosure further provides a computer program product, including a computer program, where the computer program, when executed by a processor, implements the method according to the foregoing method embodiments.

The present disclosure provides a method, an apparatus, and a server for video processing. The server receives a playing request for a first video, and obtains a plurality of video stream encoding results associated with a plurality of video parameters of the first video, where the playing request includes a target video parameter used by an electronic device to play the first video, and the plurality of video parameters include the target video parameter; determines, from the plurality of video stream encoding results, a target encoding result associated with the target video parameter, and transcodes the target encoding result to obtain a first video stream; determines a first playing progress of the first video stream and a slice record of a second video stream, where the second video stream is a video stream that has been transcoded and sliced from the plurality of video stream encoding results; slices the first video stream based on the first playing progress and the slice record to obtain a video slice, and sends the video slice to the electronic device. In the foregoing method, because the server may obtain the slice record of another slice that has been sliced, and slice the first video stream based on the playing progress and the slice record of the first video stream, the slice location of the first video stream is the same as the slice location of the video stream of another video parameter without generating a video stream of another video parameter for synchronization slice, thereby saving the transcoding resources of the server.

Figure 15:
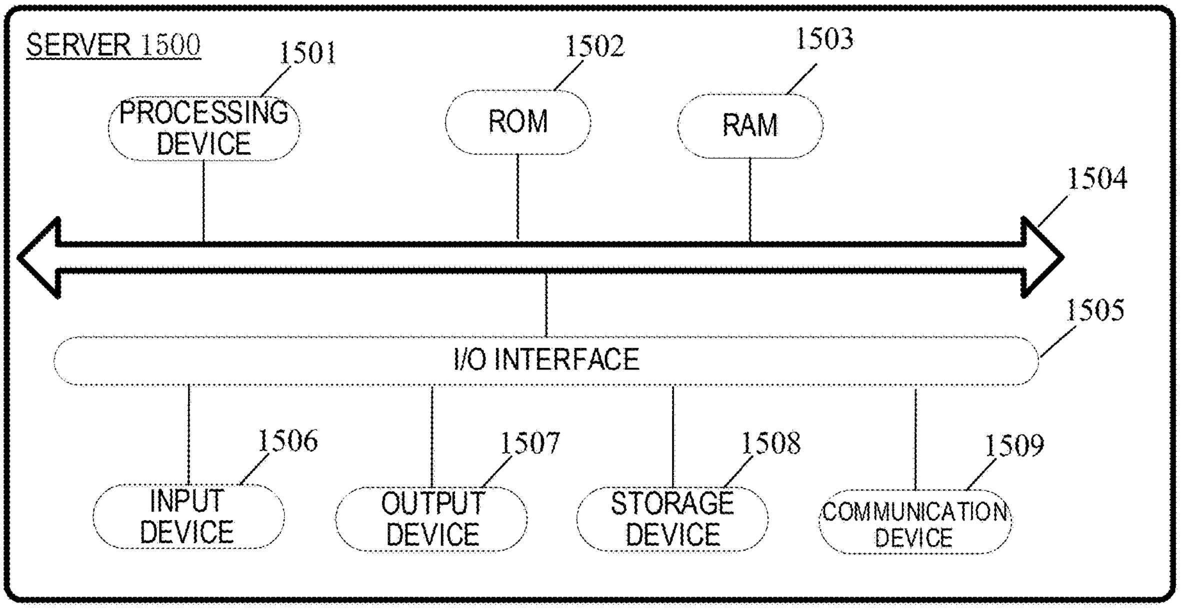
FIG. 15 is a schematic structural diagram of a server according to an embodiment of the present disclosure.

FIG. 15 is a schematic structural diagram of a server according to an embodiment of the present disclosure. FIG. 15 is a schematic structural diagram of a server 1500 suitable for implementing an embodiment of the present disclosure. The server may include, but is not limited to, a mobile terminal such as a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), and a fixed terminal such as a digital TV, a desktop computer, or the like. The electronic device shown in FIG. 15 is merely an example, and should not impose any limitation on the functions and scope of use of the embodiments of the present disclosure.

As shown in FIG. 15, the server 1500 may include a processing device (for example, a central processing unit, a graphics processor, etc.) 1501, which may perform various appropriate actions and processing according to a program stored in a read only memory (ROM) 1502 or a program loaded into a random access memory (RAM) 1503 from a storage device 1508. In the RAM 1503, various programs and data required by the operation of the server 1500 are also stored. The processing device 1501, the ROM 1502, and the RAM 1503 are connected to each other through a bus 1504. An input/output (I/O) interface 1505 is also connected to the bus 1504.

Generally, the following devices may be connected to the I/O interface 1505: an input device 1506 including, for example, a touch screen, a touch pad, a keyboard, a mouse, a camera, a microphone, an accelerometer, a gyroscope, etc.; an output device 1507 including, for example, a liquid crystal display (LCD), a speaker, a vibrator, etc.; a storage device 1508 including, for example, a magnetic tape, a hard disk, etc.; and a communication device 1509. The communication device 1509 may allow the server 1500 to communicate wirelessly or wired with other devices to exchange data. Although FIG. 15 illustrates a server 1500 having various devices, it should be understood that it is not required to implement or have all illustrated devices. More or fewer devices may alternatively be implemented or provided.

In particular, according to an embodiment of the present disclosure, the process described above with reference to the flowchart may be implemented as a computer software program. For example, embodiments of the present disclosure include a computer program product comprising a computer program embodied on a computer readable medium, the computer program comprising program code for performing the method shown in the flowchart. In such embodiments, the computer program may be downloaded and installed from the network through the communication device 1509, or installed from the storage device 1508, or from the ROM 1502. When the computer program is executed by the processing apparatus 1501, the foregoing functions defined in the method of the embodiments of the present disclosure are performed.

It should be noted that the computer-readable medium described above may be a computer readable signal medium, a computer readable storage medium, or any combination of the foregoing two. The computer-readable storage medium may be, for example, but not limited to, an electrical, magnetic, optical, electromagnetic, infrared, or semiconductor system, device, or device, or any combination thereof. More specific examples of the computer-readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that may be used by or in connection with an instruction execution system, apparatus, or device, in the present disclosure, a computer readable signal medium may include a data signal propagated in baseband or as part of a carrier, where the computer readable program code is carried. Such propagated data signals may take a variety of forms including, but not limited to, electromagnetic signals, optical signals, or any suitable combination of the foregoing. The computer readable signal medium may also be any computer readable medium other than a computer readable storage medium that may, send, propagate, or transmit a program for use by or in connection with an instruction execution system, apparatus, or device. The program code embodied on the computer-readable medium may be transmitted by any suitable medium, including but not limited to: wires, optical cables, Radio Frequency (RF), and the like, or any suitable combination thereof.

The computer-readable medium described above may be included in the server; or may exist alone or in the server.

The computer-readable medium carries one or more programs, and when the one or more programs are executed by the server, the server performs the method shown in the foregoing embodiments.

Computer program code for performing the operations of the present disclosure may be written in one or more programming languages, including object oriented programming languages, such as Java, Smalltalk, C++, and conventional procedural programming languages, such as the "C" language or similar programming languages. The program code may execute entirely on a user computer, partially on a user computer, as a stand-alone software package, partially on a user computer, partially on a remote computer, or entirely on a remote computer or server. In the case of a remote computer, the remote computer may be connected to the user computer through any kind of network, including a local area network (LAN) or a wide area network (WAN), or may be connected to an external computer (for example, using an Internet service provider for Internet connection).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that includes one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the present disclosure may be implemented in software, or may be implemented in hardware. For example, the first obtaining unit may be further described as "obtaining at least two units of Internet Protocol addresses".

The functions described above may be performed, at least in part, by one or more hardware logic components. For example, without limitation, the exemplary types of hardware logic components that may be used include: a field programmable gate array (FPGA), an application specific integrated circuit (ASIC for short), an application specific standard product (ASSP), a system on chip (SoC for short), a complex programmable logic device (Complex Programmable Logic Device, CPLD for short), and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or devices, or any suitable combination of the foregoing. More specific examples of machine-readable storage media may include electrical connections based on one or more lines, portable computer disks, hard disks, random access memory (RAM), read-only memory (ROM), erasable programmable read-only memory (EPROM or Flash memory), optical fibers, portable compact disc read-only memory (CD-ROM), optical storage devices, magnetic storage devices, or any suitable combination of the foregoing.

The above description is merely an illustration of the preferred embodiments of the present disclosure and the principles of the application. It should be understood by those skilled in the art that the disclosure in the present disclosure is not limited to the technical solutions of the specific combination of the above technical features, and should also cover other technical solutions formed by any combination of the above technical features or their equivalent features without departing from the above disclosed concept. For example, the above features are the technical solutions formed by mutually replacing technical features disclosed in the present disclosure (but not limited to).

Further, while operations are depicted in a particular order, this should not be understood to require that these operations be performed in the particular order shown or in sequential order. In certain circumstances, multitasking and parallel processing may be advantageous. Likewise, while several specific implementation details are included in the discussion above, these should not be construed as limiting the scope of the present disclosure. Certain features described in the context of separate embodiments may also be implemented in combination in a single embodiment. Conversely, the various features described in the context of a single embodiment may also be implemented in multiple embodiments either individually or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

I claim:

1. A method for video processing, comprising:

receiving a playing request for a first video, and obtaining a plurality of video stream encoding results associated with a plurality of video parameters of the first video, wherein the playing request comprises a target video parameter used by an electronic device to play the first video, and the plurality of video parameters comprise the target video parameter;

determining, from the plurality of video stream encoding results, a target encoding result associated with the target video parameter, and transcoding the target encoding result to obtain a first video stream;

determining a first playing progress of the first video stream and a slice record of a second video stream, wherein the second video stream is a video stream that has been transcoded and sliced from the plurality of video stream encoding results; and slicing the first video stream based on the first playing progress and the slice record to obtain a video slice, and sending the video slice to the electronic device.

2. The method of claim 1, wherein the slice record comprises a plurality of slice locations; and the slicing the first video stream based on the first playing progress and the slice record to obtain the video slice comprises:

determining, based on a playing progress associated with the plurality of slice locations, the latest slice location in terms of the playing progress from the plurality of slice locations; and slicing the first video stream based on the first playing progress and the first slice location to obtain the video slice.

3. The method of claim 2, wherein the slicing the first video stream based on the first playing progress and the first slice location to obtain the video slice comprises:

in response that the first playing progress is less than or equal to a second playing progress associated with the first slice location, detecting, from the slice record, whether the second video stream is sliced at the first playing progress to obtain a detection result, and slicing the first video stream based on the detection result; and in response that the first playing progress is greater than the second playing progress, obtaining a first duration between the first playing progress and a playing progress associated with a previous slice location, and slicing the first video stream based on the first duration.

4. The method of claim 3, wherein the slicing the first video stream based on the detection result comprises:

in response that the detection result indicates that the second video stream is sliced at the first playing progress, slicing the first video stream at the first playing progress to obtain the video slice; and in response that the detection result indicates that the second video stream is not sliced at the first playing progress, obtaining a second slice location after the first playing progress, and slicing the first video stream at a playing progress associated with the second slice location to obtain the video slice.

5. The method of claim 3, wherein the slicing the first video stream based on the first duration comprises:

in response that the first duration is greater than or equal to a first threshold, slicing the first video stream at the first playing progress to obtain the video slice; and in response that the first duration is less than the first threshold, slicing the first video stream until the first duration is equal to the first threshold, to obtain the video slice.

6. The method of claim 1, further comprising:

obtaining play information of the second video stream; and slicing the second video stream based on the playing information to obtain the slice record.

7. The method of claim 6, wherein the slicing the second video stream based on the playing information to obtain the slice record comprises:

in response that the play information indicates that a video frame that is being played in the second video stream is a key frame, and/or the play information indicates that a duration of a slice that is being played in the second video stream reaches a second threshold, slicing the second video stream to obtain the slice record.

8. The method of claim 1, further comprising:

determining whether the first video stream is a video stream that was switched for a first time;

in response to determining that the first video stream is a video stream that was switched for the first time, determining, from the plurality of slice locations, a third slice location with a slowest playing progress, and initializing a slice record of the first video stream based on the first playing progress and the third slice location; and in response to determining that the first video stream is not a video stream that was switched for the first time, stopping initializing the slice record of the first video stream.

9. The method of claim 8, wherein the initializing the slice record of the first video stream based on the first playing progress and the third slice location comprises:

in response that the first playing progress is less than a third playing progress associated with the third slice location, discarding the first video stream; and in response that the first playing progress is greater than or equal to the third playing progress associated with the third slice location, determining, from the slice record, a target slice associated with the first playing progress, and initializing the slice record of the first video stream to the slice record of the target slice.

10. A server, comprising: a processor and a memory;

the memory storing computer executable instructions; and the processor executing the computer-executable instructions stored in the memory to cause the processor to perform acts comprising:

receiving a playing request for a first video, and obtaining a plurality of video stream encoding results associated with a plurality of video parameters of the first video, wherein the playing request comprises a target video parameter used by an electronic device to play the first video, and the plurality of video parameters comprise the target video parameter;

determining, from the plurality of video stream encoding results, a target encoding result associated with the target video parameter, and transcoding the target encoding result to obtain a first video stream;

determining a first playing progress of the first video stream and a slice record of a second video stream, wherein the second video stream is a video stream that has been transcoded and sliced from the plurality of video stream encoding results; and slicing the first video stream based on the first playing progress and the slice record to obtain a video slice, and sending the video slice to the electronic device.

11. The server of claim 10, wherein the slice record comprises a plurality of slice locations; and the slicing the first video stream based on the first playing progress and the slice record to obtain the video slice comprises:

determining, based on a playing progress associated with the plurality of slice locations, the latest slice location in terms of the playing progress from the plurality of slice locations; and slicing the first video stream based on the first playing progress and the first slice location to obtain the video slice.

12. The server of claim 11, wherein the slicing the first video stream based on the first playing progress and the first slice location to obtain the video slice comprises:

in response that the first playing progress is less than or equal to a second playing progress associated with the first slice location, detecting, from the slice record, whether the second video stream is sliced at the first playing progress to obtain a detection result, and slicing the first video stream based on the detection result; and in response that the first playing progress is greater than the second playing progress, obtaining a first duration between the first playing progress and a playing progress associated with a previous slice location, and slicing the first video stream based on the first duration.

13. The server of claim 12, wherein the slicing the first video stream based on the detection result comprises:

in response that the detection result indicates that the second video stream is sliced at the first playing progress, slicing the first video stream at the first playing progress to obtain the video slice; and in response that the detection result indicates that the second video stream is not sliced at the first playing progress, obtaining a second slice location after the first playing progress, and slicing the first video stream at a playing progress associated with the second slice location to obtain the video slice.

14. The server of claim 12, wherein the slicing the first video stream based on the first duration comprises:

in response that the first duration is greater than or equal to a first threshold, slicing the first video stream at the first playing progress to obtain the video slice; and in response that the first duration is less than the first threshold, slicing the first video stream until the first duration is equal to the first threshold, to obtain the video slice.

15. The server of claim 10, wherein the acts further comprise:

obtaining play information of the second video stream; and slicing the second video stream based on the playing information to obtain the slice record.

16. The server of claim 15, wherein the slicing the second video stream based on the playing information to obtain the slice record comprises:

in response that the play information indicates that a video frame that is being played in the second video stream is a key frame, and/or the play information indicates that a duration of a slice that is being played in the second video stream reaches a second threshold, slicing the second video stream to obtain the slice record.

17. The server of claim 10, wherein the acts further comprise:

determining whether the first video stream is a video stream that was switched for a first time;

in response to determining that the first video stream is a video stream that was switched for the first time, determining, from the plurality of slice locations, a third slice location with a slowest playing progress, and initializing a slice record of the first video stream based on the first playing progress and the third slice location; and in response to determining that the first video stream is not a video stream that was switched for the first time, stopping initializing the slice record of the first video stream.

18. The server of claim 17, wherein the initializing the slice record of the first video stream based on the first playing progress and the third slice location comprises:

in response that the first playing progress is less than a third playing progress associated with the third slice location, discarding the first video stream; and in response that the first playing progress is greater than or equal to the third playing progress associated with the third slice location, determining, from the slice record, a target slice associated with the first playing progress, and initializing the slice record of the first video stream to the slice record of the target slice.

19. A non-transitory computer-readable storage medium, wherein the computer-readable storage medium stores computer-executable instructions, and the computer-executable instructions, when executed by the processor, implementing acts comprising:

receiving a playing request for a first video, and obtaining a plurality of video stream encoding results associated with a plurality of video parameters of the first video, wherein the playing request comprises a target video parameter used by an electronic device to play the first video, and the plurality of video parameters comprise the target video parameter;

determining, from the plurality of video stream encoding results, a target encoding result associated with the target video parameter, and transcoding the target encoding result to obtain a first video stream;

determining a first playing progress of the first video stream and a slice record of a second video stream, wherein the second video stream is a video stream that has been transcoded and sliced from the plurality of video stream encoding results; and slicing the first video stream based on the first playing progress and the slice record to obtain a video slice, and sending the video slice to the electronic device.

20. The non-transitory computer-readable storage medium of claim 19, wherein the slice record comprises a plurality of slice locations; and the slicing the first video stream based on the first playing progress and the slice record to obtain the video slice comprises:

determining, based on a playing progress associated with the plurality of slice locations, the latest slice location in terms of the playing progress from the plurality of slice locations; and slicing the first video stream based on the first playing progress and the first slice location to obtain the video slice.

* * * * *